C. W. GARLAND.
Traps for Sinks and Basins.
No. 153,940.
Patented Aug. 11, 1874.
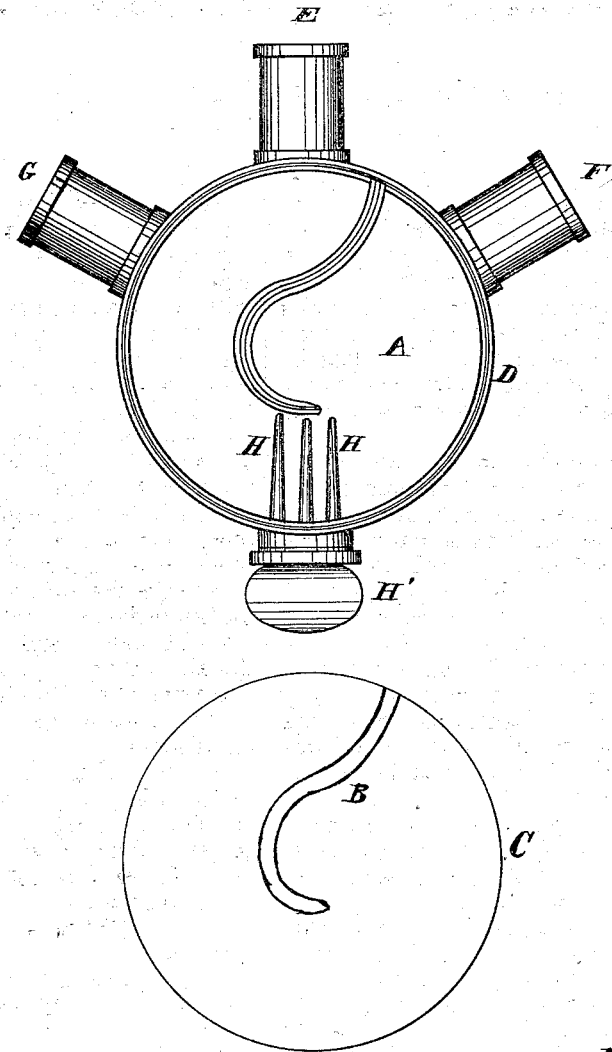
Witnesses.
Geo Stone
Saml R Martin
Inventor.
Chas W Garland
By his Atty
C W M Smith

UNITED STATES PATENT OFFICE.

CHARLES W. GARLAND, OF SAN FRANCISCO, CALIFORNIA.

IMPROVEMENT IN TRAPS FOR SINKS AND BASINS.

Specification forming part of Letters Patent No. 153,940, dated August 11, 1874; application filed May 5, 1874.

*To all whom it may concern:*

Be it known that I, CHARLES W. GARLAND, of San Francisco, in the county of San Francisco and State of California, have invented an Improvement in Traps for Sinks and Basins; and I do hereby declare that the following is a full, clear, and exact description of the same, reference being had to the annexed drawings and to the letters marked thereon.

The drawing represents an elevation of my invention with one side of cover removed.

My invention consists mainly in inclosing the trap or S on all sides by a water and air tight case, and combining it with an induction, eduction, and overflow pipe. A plug screws into the lower end of the case, having pins extending up to near the lower end of the trap, so that the flow of water will not be checked but foreign substances be caught upon its points and be discharged from time to time by withdrawing the plug and not pass onto the exit-pipe and choke it, as in the use of the ordinary S trap.

A represents a metal case, the sides of which, when in position, are intended to be water and air tight, and for this purpose an S-shaped groove, B, is made in the face of the plate or cover C to correspond to the shape of the trap, and when this cover is soldered to the rim D of the case no air or water will pass through above the lower point of the S.

Water is received into the trap from the basin through the pipe E, and passes down through the trap and out through the exit-pipe F; and the case being always filled with water above the lower end of the S trap no stench can return to the apartment. The pipe G is an overflow-pipe, and is connected to the basin near the top, so that it will not be permitted to overflow, but all of the water will pass into the case and beneath the trap and out at the exit-pipe F. The points H of the plug, or thumb-screw H', arrest all matter—such as sticks, thread, and pins—that would tend to choke the exit-pipe, and this can be removed by unscrewing the plug.

A projection or lug might be cast or formed on the inside of each disk below the S to arrest the debris and divide the stream, but the above I think preferable.

Having thus described my invention, what I claim as new, and desire to secure by Letters Patent, is—

An inclosed S trap, having its sides air and water tight and provided with a thumb-screw or plug, H, with pins H', substantially as shown and specified.

In witness whereof I have hereunto set my hand and seal.

CHAS. W. GARLAND. [L. S.]

Witnesses:
   A. J. COLBY,
   C. W. M. SMITH.